United States Patent Office 3,255,405
Patented June 7, 1966

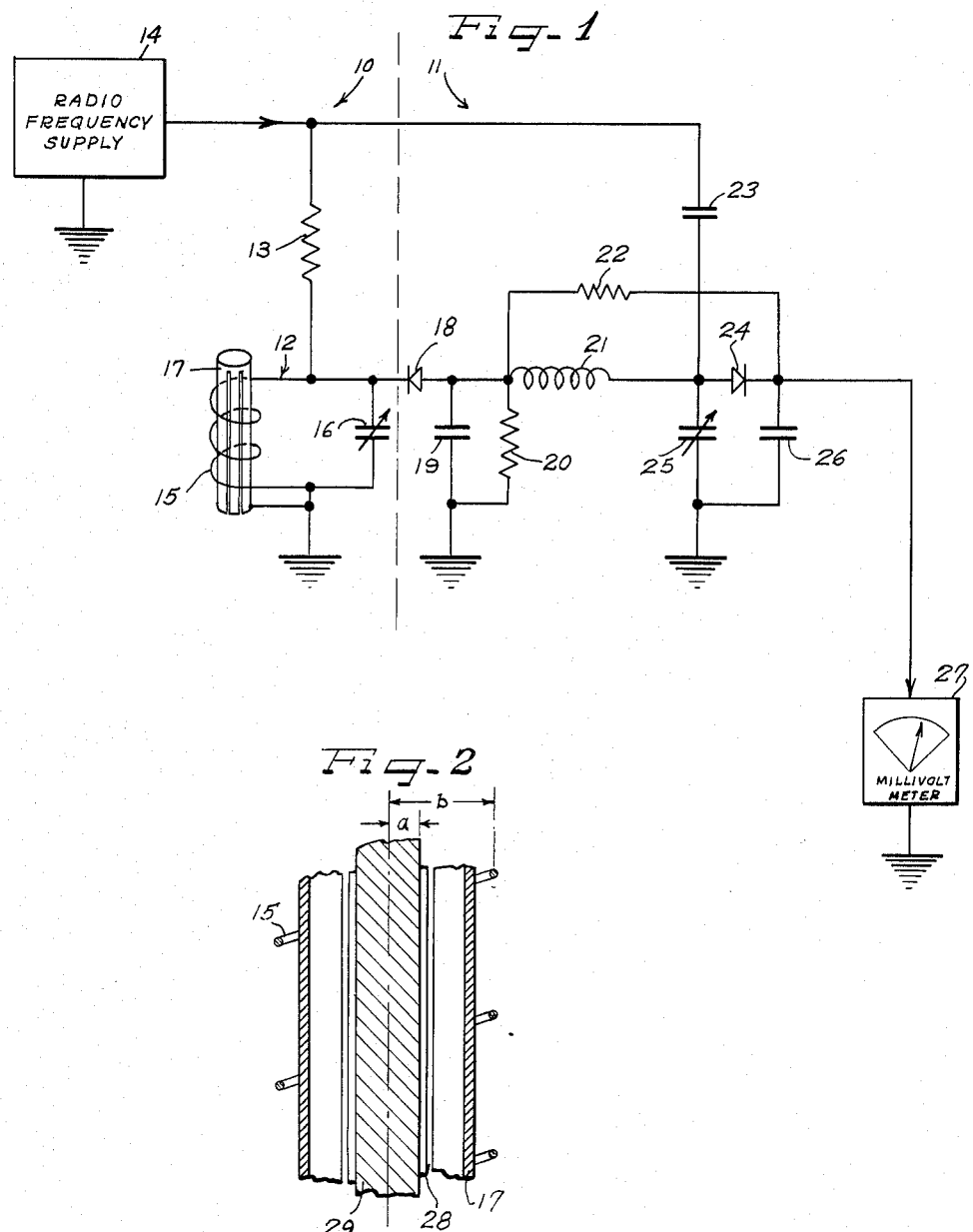

3,255,405
APPARATUS FOR MEASURING THE ELECTRICAL CONDUCTIVITY OF A SAMPLE
Park French, Aurora, Ohio, assignor to TRW Inc., a corporation of Ohio
Filed Apr. 7, 1961, Ser. No. 101,551
1 Claim. (Cl. 324—34)

This invention relates to apparatus and method for measuring the electrical conductivity of a material and, more particularly, to an apparatus and method whereby the electrical conductivity of a test sample is measured using magnetic coupling.

In many instances it is desirable to be able to measure the electrical conductivity of a material in such a way that electrodes in contact with the material are not required. For example, the use of electrodes is not desirable when measuring the conductivity of electrolytes because the electrodes may give rise to errors due to polarization at the electrode surfaces. In another instance, the use of electrodes when measuring the conductivity of an ionized gas can introduce errors because the condition of the gas adjacent the electrodes is modified by the electrodes presence. In still another field, the use of electrodes when dealing with sterile solutions presents difficulty because of the threat of contamination.

An apparatus has been introduced for the purpose of measuring the electrical conductivity of samples such as plasmas which uses magnetic coupling rather than electrodes. That device operates by setting up a magnetic field using an inductor in the vicinity of the sample and measuring the change in the inductance due to the presence of the sample, which is taken as a measure of its conductivity. However, this type of device has a fundamental disadvantage in that in order for there to be an appreciable inductance change due to the sample the frequency of the magnetic field set up by the coil must be relatively high, which causes self shielding of the interior of the sample under test. The outer portion of the test sample acts as a shield for the inner portion at these high frequencies so that the testing device is highly sensitive to the surface condition of the sample and almost insensitive to the interior of the sample. Also, the prior art testing device tends to have a quite complicated meter circuit and it is sensitive to interference due to mechanical vibrations and external electrical phenomena.

Accordingly, it is an object of this invention to provide an apparatus for measuring the electrical conductivity of a test sample using magnetic coupling that obviates these disadvantages.

It is another object of this invention to provide a conductivity meter which is magnetically coupled to the test sample and measures the resistive dissipation by radio-frequency currents induced in the sample.

It is still another object of this invention to provide a conductivity meter which is magnetically coupled to the test sample and which is more uniformly sensitive to the inner and outer regions of the sample than existing related devices.

It is still another object of this invention to provide a conductivity meter which has a very simple meter circuit and is free from interference by mechanical vibrations and external electrical phenomena.

Other objects, features and advantages of the present invention will be apparent from the following detailed description taken in conjunction with the accompanying figures of the drawing, in which:

FIGURE 1 is a schematic diagram of a conductivity meter constructed in accordance with the invention; and FIGURE 2 is a schematic illustration of a portion of the sensing coil and sample.

As shown on the drawings: The conductivity meter illustrated in FIGURE 1 includes a first circuit 10 that sets up an alternating magnetic field in the vicinity of a test sample and a second circuit 11 that is designed to measure a voltage change that is produced when a test sample is placed in the alternating magnetic field.

The circuit 10 includes a parallel resonant circuit 12 that is connected in series with a high impedance element 13 between a radio-frequency current supply 14 and a reference ground potential. While the impedance element 13 is shown as being a resistor, it should be understood that a reactive element could be used instead. The inductive impedance of the parallel resonant circuit 12 is provided by a sensing coil 15 and the capacitive impedance is the sum of the wiring capacity, the stray capacity of these components, and the capacity of a tuning capacitor 16, which can be adjusted to obtain a desired resonant frequency. The circuit 10 also includes a Faraday shield 17 which is connected to the ground reference potential and inserted inside of the coil 15. This shield 17 is in the form of a slotted metal cylinder which has its slots running in the axial direction.

The value of the series impedance 13 is made large as compared to the impedance of the parallel resonant circuit 12, so that the effect of changes in the resonant circuit 12 impedance on the magnitude of the radio-frequency current from the supply 14 is reduced considerably. If the value of the impedance 13 of the order of ten times the resonant circuit 12 impedance, the effect of changes in the resonant circuit impedance is almost negligible. In these circumstances, the primary effect of an impedance change is to change the magnitude of the radio-frequency voltage developed across this resonant circuit 12, and for all practical purposes this change in voltage is linear with the impedance change through the range of impedance changes that occur.

In operation, the frequency of the radio-frequency supply 14 and the natural resonant frequency of the resonant circuit 12 are made equal, and a sample of the material to be tested is placed within the sensing coil 15 and the shield 17. The alternating magnetic field generated by the sensing coil 15 produces circulating eddy currents in the sample which consume power, thereby lowering the impedance of the resonant circuit 12 and the voltage developed across it. The magnitude of this power consumption and the voltage drop is related to the electrical conductivity of the sample material, and it is this voltage change which is measured by the circuit 11 and taken as being representative of the test sample conductivity. The voltage developed across the parallel resonant circuit 12 consists of a relatively large quantity which corresponds to the voltage value without a sample minus a relatively small quantity which is due to the power absorption by the test sample. To provide adequate instrument sensitivity this larger voltage should be cancelled and, for reasons of practicality, this cancelling voltage should be derived from the same radio-frequency source that supplies the sensing coil 15. This cancelling voltage is developed by the measuring circuit 11 which operates such that any fluxuation in the current output of the supply 14 will change by equal amounts the voltage drop across the resonant circuit 12 and the value of the cancelling voltage.

The measuring circuit 11 includes a diode 18 and a capacitor 19 which rectify and filter the voltage developed across the resonant circuit 12. A resistor 20 connected in parallel with the capacitor 19 allows the voltage across the capacitor 19 to decrease when the radio-frequency voltage amplitude across the resonant circuit 12 decreases. The direct current voltage across the capacitor 19 has been found experimentally to vary linearly with the radio-frequency current amplitude.

The radio-frequency supply 14 also causes current to flow through a fixed capacitor 23 and a variable capacitor 25 to the reference ground potential. The capacitor 25 is made variable so that the amplitude of the cancelling voltage can be adjusted, and the fixed capacitor 23 serves as a high impedance element that limits the value of the radio-frequency current supplied to the capacitor 25. A second diode 24 rectifies the radio-frequency voltage developed across the variable capacitor 25 in order to develop a cancelling voltage which is equal and of opposite sign to the voltage developed by the sensing circuit across the capacitor 19. A resultant voltage is produced by adding the cancelling voltage to the voltage developed by the sensing circuit through a choke 21, which must be used in order to decouple the sensing and cancelling circuits with respect to the radio-frequency currents.

The resultant voltage appears across another capacitor 26 and a voltmeter 27 measures its magnitude. The circuit is preferably designed so that there is zero output with no sample in the sensing coil 15 and the meter will go positive at a rate that is proportional to the conductivity of the test sample. A resistor 22 is connected in parallel with the choke coil 21 and diode 24 and provides a discharge path for the capacitor 26.

It can be seen that with this arrangement the zero setting of the instrument is independant of fluxuations in the radio-frequency amplitude of the supply 14 because both the sensing voltage and the cancelling voltage are proportional to the amplitude of the input radio-frequency signals.

The effect of input fluxuations on the conductivity measurements is also evident. The output voltage from the instrument is the difference between the sensing and the cancelling voltages, and consequently is proportional to the input radio-frequency amplitude. Therefore, the fractional error in the output is equal to the fractional error in the input radio-frequency amplitude, provided the instrument has been properly zeroed and considering only the error arising from input fluxuations. Assuming an input fluxuation of one percent, the conductivity could be measured to within one percent, which is tolerable for many purposes.

The relationship between the test sample conductivity and the voltage change appearing across the resonant circuit 12 can be measured if certain necessary conditions are met. These conditions are as follows:

(1) This test sample must be of uniform conductivity; the need for this requirement will become evident in the following example to be developed.
(2) The sample must be of definite and reproducible geometric form; the form will be seen to affect the calibration of the instrument.
(3) The magnetic permeability of the sample must be essentially unity; the permeability will be seen to affect the operation of the instrument. For permeabilities which are known and are close to unity, a correction to the instrument calibration can be calculated.
(4) The presence of the test sample in the sensing coil must not appreciably alter the resonant frequency of the sensing circuit; a simple relationship between the resonant circuit impedance and the test sample conductivity exists only so long as the natural frequency of the resonant circuit 12 nearly matches the frequency of the radio-frequency supply 14.

To ensure that the sample does not appreciably alter the circuit constants which determine the circuit 12 natural frequency, two measures are taken. First of all, the test sample is electrostatically shielded from the sensing coil 15 by the Faraday shield 17, as illustrated in FIGURE 2. This shield prevents alteration of the circuit capacity by the sample. Since the slots 28 in the shield 17 run in the axial direction, circulating azimuthal currents cannot flow in the shield. As a result, it does not act as a magnetic shield and therefore does not interfere with the circulating currents induced in the sample 29, FIGURE 2. As a second precaution, the circuit is operated at a frequency which is sufficiently low that the self shielding of the sample 29 is negligible. This amounts to saying that the spatial configuration of the component of the magnetic field which is in phase with the coil current is not altered by the sample 29. Provided that the currents induced in the sample are sufficiently small compared to the driving coil 15 current, they will be essentially 90° out of phase with the driving current. Under these circumstances the inphase component of the magnetic field will not be appreciably altered, with the result that the circuit inductance will also remain essentially uneffected. The frequency limitations imposed by this condition will be discussed in greater detail hereinafter.

The following is an analysis of a simple example wherein a cylindrical sample 29 having a radius $a$ is placed in a long solenoid sensing coil 15 that has a radius $b$ and $n$ turns per unit length. The interaction between a unit length of the sample 29 will be calculated neglecting end effects and using Gaussian units.

The magnetic field produced by a current I flowing in the coil 15 is axial in direction and is uniform everywhere inside this coil. For a sample having unity permeability, the flux density is given by the equation $$B = 4\pi n I \quad (1)$$

The induced electric field is in the azimuthal direction in this case. The total E.M.F. induced in a circular loop of radius $r$ is $$V(r) = (1/C)(d/dt)\phi(r) \quad (2)$$

where $c$ is the velocity of light and $\phi$ is the flux enclosed in the loop. This flux is $$\phi(r) = \pi r^2 M \quad (3)$$

From Equation (1) this becomes $$\phi = 4\pi^2 n r^2 I \quad (4)$$

Assuming the current to be sinusoidal, with angular frequency $\omega$ and R.M.S. amplitude $I_{R.M.S.}$, the R.M.S. voltage induced in a loop can be written. From Equations (2) and (4), this is $$V_{R.M.S.} = r/c \pi^2 n \omega r^2 I_{R.M.S.} \quad (5)$$

The conductance per unit radius of the sample is $$dG/dr = \frac{\sigma}{2\pi r} \quad (6)$$

The current per unit radius is $$di_{R.M.S.}/dr = V_{R.M.S.}(dG/dr) \quad (7)$$

From Equations (5) and (6), this becomes $$di_{R.M.S.}/dr = (2\pi/C) n \sigma \omega r I_{R.M.S.} \quad (8)$$

The power dissipated per unit radius is $$dW/dr = CV_{R.M.S.}(di_{R.M.S.}/dr) \quad (9)$$

Combining Equations (5) and (8), $$(dW/dr) = (8\pi^3/C) n^2 \sigma \omega^2 r^3 I^2_{R.M.S.} \quad (10)$$

The total power dissipated is $$W = (8/C)\pi^3 n^2 \sigma \omega^2 I^2_{R.M.S.} \int_0^a r^3 dr \quad (11)$$

$$W = (2/C)\pi^3 n^2 a^4 \sigma \omega^2 I^2_{R.M.S.} \quad (12)$$

The energy stored in the field at maximum is $$E = \pi b^2 (B^2_{max}/8\pi) \quad (13)$$

Which is, from Equation (1), $$E = 4\pi^2 n^2 b^2 I^2_{R.M.S.} \quad (14)$$

The energy dissipated in the sample per cycle is $$\Delta W_s = (4/C)\pi^4 n^2 a^4 \sigma \omega I^2_{R.M.S.} \quad (15)$$

Exclusive of the sample losses, the energy lost from the circuit per cycle is related to the circuit Q. The relationship can be applied here on a unit length basis by assuming the circuit losses to be distributed uniformly along the coil. By usual definition, $$Q = 2\pi E / \Delta W_c \qquad (16)$$

where again E is the maximum stored energy, and $\Delta W_c$ is the circuit loss per cycle. From Equations (14) and (16), the energy loss per cycle exclusive of sample losses is $$\Delta W_c = 8\pi^3 n^2 b^2 I^2_{R.M.S.} / Q \qquad (17)$$

Adding the sample loss from Equation (15), the total loss per cycle is $$\Delta w = \frac{8\pi^3 n^2 b^2 I^2_{R.M.S.}}{Q} + \frac{4\pi^4 n^2 a^4 \sigma \omega I^2_{R.M.S.}}{c} \qquad (18)$$

$$\Delta w = 4\pi^3 n^2 b^2 I^2_{R.M.S.} \left[ \frac{2}{Q} + \frac{\pi a^4 \sigma \omega}{b^2 c} \right] \qquad (18')$$

The ratio of the maximum stored energy to the total loss per cycle is $$\frac{E}{\Delta W} = \frac{1}{2\pi \left[ \frac{1}{Q} + \frac{\pi a^4 \sigma \omega}{2 b^2 c} \right]} \qquad (19)$$

This expression has been developed for a unit length of coil and sample. Since both E and $\Delta W$ vary linearly with coil and sample length, this ratio also applies to the entire resonant circuit. From Equations (16) and (19) we can find a new circuit Q which includes sample losses. Designating the new value $Q'$, we have $$Q' = \frac{1}{\frac{1}{Q} + \frac{\pi a^4 \sigma \omega}{2 b^2 c}} \qquad (20)$$

For high-Q circuits the resonant impedance is proportional to the Q value. The fractional change in impedance due to the sample absorption is $$\frac{\Delta Z}{Z_0} = \frac{Q - Q'}{Q} \qquad (21)$$

where $Z_0$ is the impedance with no sample. In terms of Equation (20), Equation (21) is $$\frac{\Delta Z}{Z_0} = 1 - \frac{1}{1 + \frac{\pi a^4 \sigma \omega Q}{2 b^2 c}} \qquad (22)$$

Since the quantity on the right of the denominator of the last term will always be small compared to unity, Equation (22) can be accurately approximated by $$\frac{\Delta Z}{Z_0} = \frac{\pi a^4 \sigma \omega Q}{2 b^2 c} \qquad (23)$$

If we assume that a constant radio-frequency current is fed to the resonant circuit, the voltage developed by this circuit will be proportional to the resonant impedance. The fractional voltage change caused by the sample is therefore, $$\frac{\Delta V}{V} = \frac{\pi a^4 \sigma \omega Q}{2 b^2 c} \qquad (24)$$

Here the sample conductivity is in Gaussian units. Using more familiar c.g.s. units, mho/cm., for the conductivity, and using the frequency $f$ rather than the angular frequency $\omega$ Equation (24) becomes $$\frac{\Delta V}{V} = \frac{15 a^4 Q f \sigma}{2 b^2 c} \qquad (25)$$

From Equations (24) and (25), it can be seen that the relative voltage output varies directly with the frequency of the supply 14. These expressions would appear to indicate that relatively high frequencies should be used in order to obtain a high degree of sensitivity. However, in the development of these expressions the magnetic flux density was assumed to be constant throughout the sample, and this assumption intrinsically carries with it an upper frequency limit.

When electromagnetic radiation falls on a plane conducting surface, part of the radiation penetrates the conductor. However, the amplitude of this radiation falls off by a factor of $1/e$ for each characteristic distance traversed inside the conductor. In the c.g.s. units, this "skin depth" is $$\delta = 1.26 \times 10^4 (\omega \sigma \mu)^{-1/2} \qquad (26)$$

where $\sigma$ again is the conductivity in mho/cm., and $\mu$ is the permeability of the sample. As applied to the cylindrical geometry used in the present case, this expression no longer gives the exact rate of amplitude decrease. Nevertheless, it does serve as a guide in determining the maximum frequency allowable. By requiring that the skin depth as given by Equation (26) be at least two times the sample radius, the condition of no self shielding is effectively fulfilled. The upper frequency limit can be calculated by substituting the known permeability and conductivity of the material into this Equation (26), making the distance $\delta$ at least two times the known radius of the sample, and calculating the angular frequency $\omega$.

If an excessively high frequency is used, the self shielding which occurs when the skin depth becomes comparable to the sample radius results in a smaller voltage output for a given conductivity than would be expected from the above calculations for the example. Since the skin depth changes with conductivity, the meter would have a nonlinear relationship between the conductivity and the output voltage. This aspect should have little practical significance, however, since the nonlinearity can be dealt with by calibrating the meter using samples of known conductivity. A second effect of using an excessively high frequency is more serious however. From Equation (10) it can be seen that the absorbed power per unit radius increases as $r^3$ inside the sample. Since the sample volume per unit radius increases linearly with $r$, it follows that the power absorption per unit volume goes as $r^2$. This $r^2$ factor may be regarded as a weighting factor in computing the total power absorption. It is clear from this that $r^2$ factor that any nonuniformity in the outer region of the sample will result in an exaggerated error in the output voltage. Therefore, the sample must be of known and reproduceable radius and have a uniform conductivity. The situation is much worse in the case of self shielding. As a first approximation (and one that would be quite good for $\delta$ small compared to the sample radius) the weighting factor would become $r^2 e^r / \delta$. For $\delta$ even as large as one half the sample radius, this extra weighting would make many conductivity measurements far too dependent on the sample surface condition.

In the case of a sample with permeability different from unity, the relationship given in Equation (26) will allow the caluculation of the maximum operating frequency. From Equation (1) it is seen that the permeability also enters the calculations at this point and Equation (1) becomes, $$B = 4\pi \mu n I \qquad (27)$$

It is clear that $\mu$ could be carried through the development for an infinitely long solenoid and sample. If $\mu$ were greater than unity in practical cases with finite lengths, however, the magnetic field inside the sensing coil would be modified by demagnetizing effects. For $\mu$ close to unity, this would cause no particular difficulty, and corrections for the sample permeability could be easily calculated. For $\mu$ significantly greater than unity, the changes in the circuit inductance and the magnetic field configurations would contribute substantially to the output of the instrument. Under these latter circumstances the conductivity measurement would be masked by the permeability effects, and the instrument's effectiveness would be destroyed.

In the preceding description and analysis it was shown that the output voltage of the conductivity meter will vary linearly with sample conductivity as long as the specified conditions are fulfilled. This linear relationship simplifies the operation of the device. Since the sensing coil is not an infinite solenoid as assumed in the example, the meter sensitivity differs slightly from the calculated value. The sensitivity can be quickly determined, however, by inserting a sample of electrolyte of known conductivity into the sensing coil. Because of the linear relationship between output voltage and conductivity, only a single point calibration is needed.

In a preferred manner of operation, a radio-frequency signal generator is attached to the input, with its amplitude adjusted to several volts. A high impedance millivolt meter is connected to the output, and the cancelling voltage is adjusted to give an output of several millivolts. Resonance is found by tuning the signal generator or the capacitor 16 for a minimum D.C. output from the meter, meanwhile keeping the millivolt meter on scale by adjustment of the compensating voltage. When the minimum is found, the compensating voltage is adjusted to give zero volts at the output terminals. A sample of known conductivity is then placed in the sensing coil and the radio-frequency signal amplitude is adjusted to give the desired D.C. output from the meter. This operation should complete the calibration of the meter, but in the event of harmonic distortion in the signal generator, it may be necessary to rezero the meter and again adjust for the desired calibration.

It can be seen that a novel and useful conductivity meter has been provided. Since the meter is magnetically coupled to the test sample, the difficulties encountered when using conventional electrodes are avoided, and, since the device measures conductivity by measuring the resistive dissipation of radio-frequency currents induced in the test sample rather than the change in the inductance of a coil produced by the presence of a conducting sample, the meter does not have the disadvantages of the prior art magnetically coupled meters.

It will be apparent that modifications and variations may be effected without departing from the scope of the novel concepts of the present invention.

I claim as my invention:

An apparatus for measuring the electrical conductivity of a test sample comprising (a) a supply of radio-frequency power,
(b) a resonant circuit having an inductor and a capacitor connected in parallel,
(c) a high impedance element connected in series with said resonant circuit to the output of said supply,
(d) a Faraday shield inserted within said inductor for receiving the test sample and having slots extending in an axial direction therein, the natural frequency of said parallel circuit being substantially equal to the frequency of said supply and being sufficiently low that the magnetic field set up by said inductor penetrates substantially uniformly throughout the test sample when it is placed within said inductor and shield,
(e) a first rectifier and filter circuit connected across said resonant circuit having an output proportional to the voltage developed across said resonant circuit,
(f) a pair of impedances connected in series across said supply,
(g) a second rectifier and filter circuit connected across one of said impedances having an output equal to the output of said first circuit without the test sample within said Faraday shield,
(h) decoupling means including a choke coil connecting the output of said first circuit in opposition to the output of said second circuit and having a resultant output voltage which is the difference between the outputs of said first and second circuits, and
(i) a meter connected to said decoupling means and responsive to the resultant voltage.

References Cited by the Examiner

UNITED STATES PATENTS

| | | | |
|---|---|---|---|
| 2,299,605 | 10/1942 | Willers | 336—84 |
| 2,452,156 | 10/1948 | Schover | 324—34 |
| 2,919,413 | 12/1959 | Charles | 324—34 |
| 2,939,073 | 5/1960 | Eul | 324—40 |
| 3,013,102 | 12/1961 | Doll | 336—84 |
| 3,094,658 | 6/1963 | Bravenec | 324—40 |

FOREIGN PATENTS 844,261   7/1939   France.

WALTER L. CARLSON, *Primary Examiner.*

FREDERICK M. STRADER, *Examiner.*

R. B. LAPIN, F. A. SEEMAR, R. J. CORCORAN,
*Assistant Examiners.*